United States Patent [19]

Tomita

[11] Patent Number: 5,210,545
[45] Date of Patent: May 11, 1993

[54] IMAGE FORMING METHOD AND SYSTEM WHEREIN A DOT IS RECORDED FOR EACH SET OF THREE CONSECUTIVE PICTURE ELEMENTS

[75] Inventor: Satoru Tomita, Yokohama, Japan

[73] Assignee: Ricoh Company, Ltd., Tokyo, Japan

[21] Appl. No.: 655,831

[22] Filed: Feb. 15, 1991

[30] Foreign Application Priority Data

Feb. 26, 1990 [JP] Japan ................................ 2-45144
Feb. 26, 1990 [JP] Japan ................................ 2-45145
Feb. 26, 1990 [JP] Japan ................................ 2-45146
Nov. 20, 1990 [JP] Japan ................................ 2-316509

[51] Int. Cl.$^5$ .......................... G01D 9/00; G01D 15/14
[52] U.S. Cl. ................................ 346/1.1; 346/107 R; 346/108; 346/160
[58] Field of Search ............... 346/107 R, 1.1, 160, 346/76 L, 108; 364/519; 358/296, 298, 300, 302, 455, 456, 457, 458, 459

[56] References Cited

U.S. PATENT DOCUMENTS

| | | | |
|---|---|---|---|
| 4,032,977 | 6/1977 | Liao | 358/455 X |
| 4,463,364 | 7/1984 | Tamura | 346/160 |
| 4,878,065 | 10/1989 | Fukushima et al. | 346/76 PH |

FOREIGN PATENT DOCUMENTS

| | | | |
|---|---|---|---|
| 0154974 | 9/1982 | Japan | 358/296 |
| 0240272 | 11/1985 | Japan | 358/296 |
| 63-290752 | 11/1988 | Japan . | |
| 64-33574 | 2/1989 | Japan . | |

Primary Examiner—Benjamin R. Fuller
Assistant Examiner—David Yockey
Attorney, Agent, or Firm—Mason, Fenwick & Lawrence

[57] ABSTRACT

An image forming method for forming an image as an array of picture elements one line by one line includes the steps of detecting the content of the picture elements for every three consecutive picture elements included in each line, each set of the three consecutive picture elements being defined by an aimed picture element located at an end and carrying a content to be recorded, a second picture element located adjacent to the first picture element, and a third picture element located adjacent to the second picture element at a side away from the first picture element; recording a non-blank dot for the aimed picture element while setting the size of the recorded dot at a first predetermined size, when a first condition that the second picture element of the three consecutive picture elements represents a blank dot and a second condition that the third picture element represents a non-blank dot are met simultaneously; recording a non-blank dot for the aimed picture element while setting the size of the dot at a second predetermined size larger than the first predetermined size when none of the foregoing first and second conditions is met; and disabling the recording of non-blank dot when the aimed picture elements has a content corresponding to a blank dot. An Image forming system includes a shift register for holding image data representing the picture elements and processing parts or a driver controller or controlling light emitting devices according to the method steps.

11 Claims, 14 Drawing Sheets

FIG. 1(A) PRIOR ART
FIG. 1(B) PRIOR ART
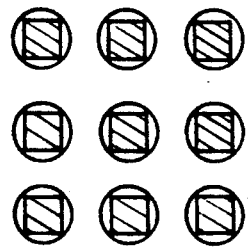
FIG. 1(C) PRIOR ART
FIG. 1(D) PRIOR ART
FIG. 1(E) PRIOR ART
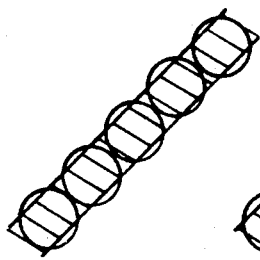
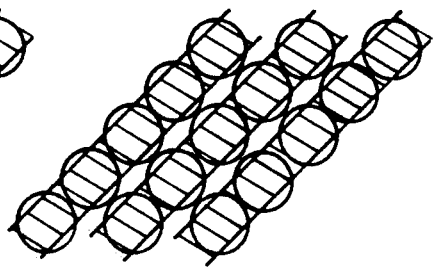
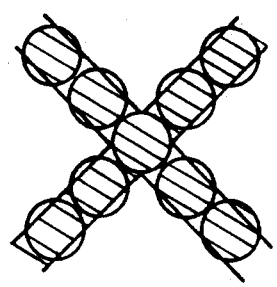
FIG. 1(F) PRIOR ART
FIG. 1(G) PRIOR ART
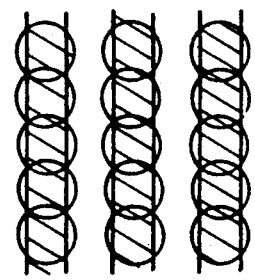
FIG. 1(H) PRIOR ART
FIG. 1(I) PRIOR ART
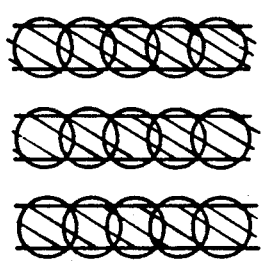

FIG. 3(A) PRIOR ART
FIG. 3(B) PRIOR ART
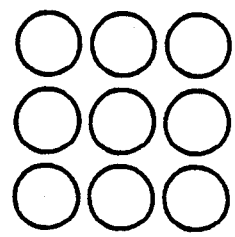
FIG. 3(C) PRIOR ART  FIG. 3(D) PRIOR ART  FIG. 3(E) PRIOR ART
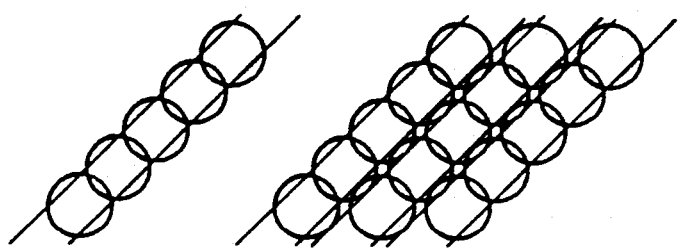 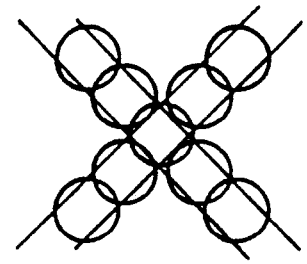
FIG. 3(F) PRIOR ART
FIG. 3(G) PRIOR ART
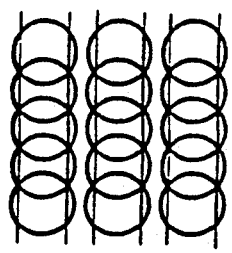
FIG. 3(H) PRIOR ART
FIG. 3(I) PRIOR ART
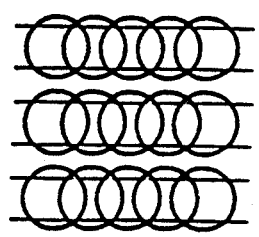

FIG. 13(A)
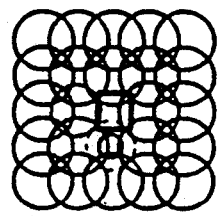
FIG. 13(B)
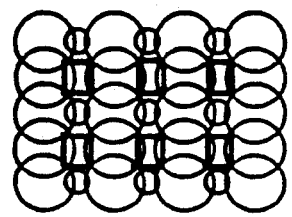
FIG. 13(C)    FIG. 13(D)    FIG. 13(E)
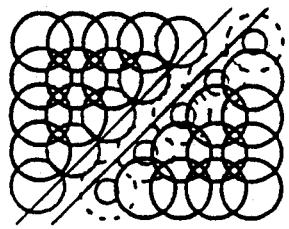 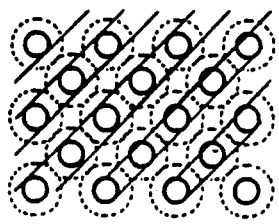 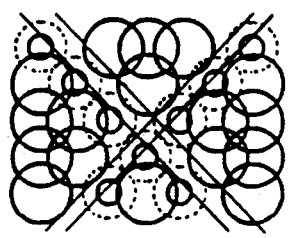
FIG. 13(F)
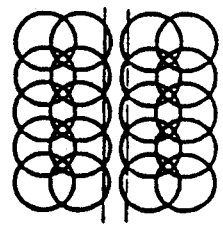
FIG. 13(G)
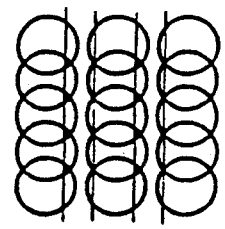
FIG. 13(H)
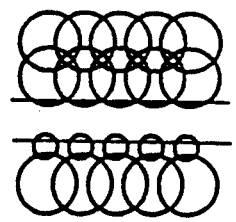
FIG. 13(I)
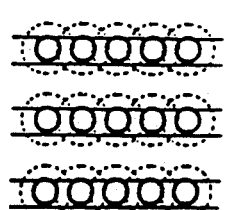

FIG. 17(A)
FIG. 17(B)
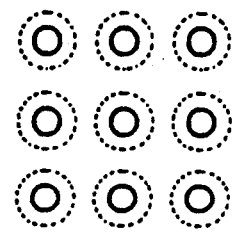
FIG. 17(C) FIG. 17(D) FIG. 17(E)
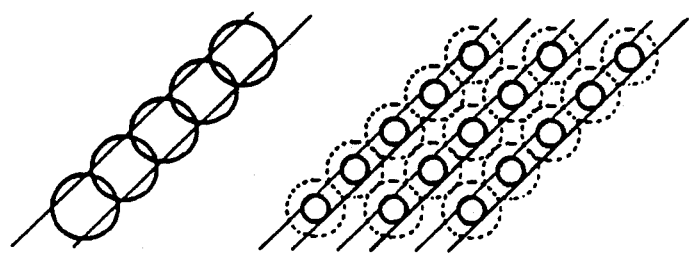 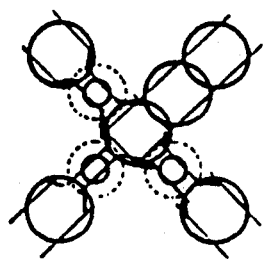
FIG. 17(F)
FIG. 17(G)
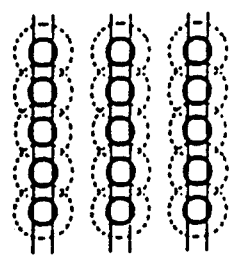
FIG. 17(H)
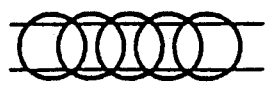
FIG. 17(I)
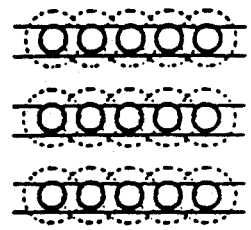

IMAGE FORMING METHOD AND SYSTEM WHEREIN A DOT IS RECORDED FOR EACH SET OF THREE CONSECUTIVE PICTURE ELEMENTS

BACKGROUND OF THE INVENTION

The present invention generally relates to image forming methods, and in particular to a method of forming an image on a recording medium by scanning an optical beam.

Conventionally, there is an image forming method wherein an image is written on a recording medium by scanning an optical beam that may be produced by a laser diode, LED array, FL dot-array, and the like. The scanning may be achieved either by using a raster-scanning system that deflects the optical beam such as a rotary polygonal mirror or a solid-state optical scanning head such as LED array, LCD shutter array or fluorescent dot array.

In any of the foregoing image forming systems, the optical beam produced by an optical source scans a charged photosensitive body in a horizontal scanning direction to form an electrostatic latent image, and this electrostatic latent image is developed by the toner. The image thus developed is then transferred on a recording sheet and fixed thereon.

In order to improve the quality of the image thus recorded, there are various proposals like the one described in the Japanese Laid-open Patent Application No.64-33574. This reference describes a system comprising memory means for storing image information of at least three scanning lines and control means for controlling at least one of the beam spot size and the beam intensity stepwise, based upon the content of the memory means. More specifically, the system controls one or both of the beam spot size and the beam intensity of a picture element that is surrounded by eight picture elements in correspondence to three scanning lines, in three to four steps based upon the image information of the eight surrounding picture elements.

Further, there is another image recording system proposed by the assignee of the present invention in the Japanese Laid-open Patent Application No.63-290752, wherein memory means for storing a plurality of picture elements including an aimed picture element and surrounding picture elements, is combined with discrimination means for discriminating whether the aimed picture element is an isolated white picture element or an isolated black picture element. Based upon the result of discrimination, the system changes the pulse width of the recording signal, and the beam size of the recording optical beam is changed based upon the recording signal.

In the former system, however, all eight picture elements have to be taken into consideration for the image processing, and there exists a problem in that a complex processing, too complex for use in an image recording apparatus, is required. The problem is deteriorated further because of the somewhat large number of steps in the stepwise control of the beam size or beam intensity. Such a complex processing inevitably increases the cost of the image recording system.

In the latter system, too, there exists the problem of too complex processing, as this system requires processing of at least five picture elements including the aimed picture element, two at both sides of the aimed picture element in the horizontal scanning direction and two at both sides of the aimed picture element in the vertical scanning direction.

Before starting the description of the present invention, the principle and problem of the image processing employed conventionally for improving the picture quality will be examined with reference to FIGS. 1(A)–1(I) and FIGS. 2(A)–2(I). These drawings show the examples of image patterns subjected to the image processing. In FIGS. 1(A)–1(I), the circles represent the position of the beam spot while the hatched region surrounded by the thick lines represents schematically the black, exposed part of the image. Thus, the drawings represent the typical image exposure process wherein the desired image is written by the optical beam that exposes the photosensitive body according to the desired image. On the other hand, FIGS. 2(A)–2(I) show the case of the background exposure process wherein the desired image corresponding to those of FIGS. 1(A)–1(I) is represented by the region that is not exposed by the optical beam.

Referring to FIGS. 1(A)–(I), FIG. 1(A) shows an isolated dot, FIG. 1(B) shows an array of isolated dots, FIG. 1(C) shows an oblique line of dots, FIG. 1(D) shows parallel oblique lines of dots, FIG. 1(E) shows a cross formed by intersecting lines of dots, FIG. 1(F) shows a vertical line of dots, FIG. 1(G) shows parallel vertical lines of dots, FIG. 1(H) shows a horizontal line of dots, and FIG. 1(I) shows parallel horizontal lines of dots. On the other hand, FIGS. 2(A)–2(I) show the counter part in the background exposure mode.

In the picture images of FIGS. 1(A)–1(I) and FIGS. 2(A)–2(I), some images, particularly those including oblique lines have problems that deteriorate the quality of the picture when recorded on a recording sheet as it is. For example, in the cross pattern of FIG. 1(E), there is a tendency that the node where the two lines cross each other tends to bulge in the recorded image because of the doubled exposure. When the size of the optical beam is reduced in correspondence to the node part to eliminate this problem, on the other hand, the node in the cross pattern of FIG. 2(E) tends to bulge. In the oblique line of FIG. 1(C), on the other hand, there arises a problem in that the line appears excessively thin because of the neck-shaped regions formed between adjacent dots.

In order to cope with these problems, conventional image recording systems have employed complex image processing as already described. When using such an image recording system for commercially competitive printers of personal computers or facsimile machines, a restriction is imposed such that the image processing employed should not be excessively complex.

SUMMARY OF THE INVENTION

Accordingly, it is a general object of the present invention to provide a novel and useful image recording system and method wherein the foregoing problems are eliminated.

Another and more specific object of the present invention is to provide an image forming method for recording an image on a recording medium as an array of exposed dots by scanning a spot of an optical beam over the recording medium, wherein the picture quality of the recorded image is improved particularly with respect to images that contain oblique lines of dots.

Another object of the present invention is to provide an image forming method that forms an image on a recording medium as an array of exposed dots by scanning a spot of an optical beam over the recording medium, wherein the size of the exposed dots is changed in response to the pattern of the images to be recorded.

Another object of the present invention is to provide an image forming method that forms an image on a recording medium as an array of exposed dots by scanning a spot of an optical beam over the recording medium in a horizontal scanning direction, wherein one or both of the beam spot size and the beam intensity are changed when at least one of two adjacent picture elements aligned in the horizontal scanning direction at either side of an aimed picture element, that is the picture element subjected to recording, represent an unexposed picture element and when a picture element that locates adjacent said unexposed picture element in the horizontal scanning direction at the side opposite to the aimed picture element represents an exposed picture element. According to the present invention, the workload at the time of image processing is significantly reduced, as there are only three consecutive picture elements involved in the image processing. Thereby, the cost of the image forming system is significantly reduced over the prior art system.

In a preferred embodiment, either the optical beam spot or the optical beam intensity is increased with respect to a value that provides a desired line thickness in the recorded image, and said beam spot size or beam intensity is decreased when said adjacent picture element next to the aimed picture element represents an unexposed picture element and simultaneously the picture element located beyond said unexposed picture element represents an exposed picture element.

Another object of the present invention is to provide an image forming method that forms an image on a recording medium as an array of exposed dots by scanning a spot of an optical beam over the recording medium in a horizontal scanning direction, wherein one or both of the beam spot size and the beam intensity are changed when an adjacent picture element aligned in a vertical scanning direction perpendicular to the horizontal scanning direction at one side of an aimed picture element, represent an unexposed picture element and when a picture element that locates beyond said unexposed picture element in the vertical scanning direction represents an exposed picture element. According to the present invention, the workload of the image processing is significantly reduced, as there are only three consecutive picture elements involved in the image processing. Further, the present invention is particularly useful in an image forming system that employs a solid state optical scanning head such as the LED array, LCD shutter array or fluorescent dot array wherein the drive circuit of the optical head is formed integral with the optical head in the form of integrated circuit.

In such an optical head, the provision of additional memories such as shift registers or latches in the integrated circuit for the processing of the foregoing picture elements does not cause any substantial problem.

Other objects and further features of the present invention will become apparent from the following description when read in conjunction with the attached drawings.

BRIEF DESCRIPTION OF THE DRAWINGS

FIGS. 1(A)–1(I) are diagrams showing various patterns of dots formed by a conventional image forming method undertaken in the image exposure mode;

FIGS. 3(A)–3(I) are diagrams showing various patterns of dots formed by another, conventional image forming method undertaken in the image exposure mode;

FIGS. 13(A)–13(I) are diagrams showing various patterns of dots formed by the system of FIG. 10 in the background exposure mode;

FIGS. 17(A)–17(I) are diagrams showing various patterns of dots formed by the system of FIG. 15 in the image exposure mode:

DETAILED DESCRIPTION

First, the principle of the present invention will be described with reference to FIGS. 3(A)–3(I) and FIGS. 4(A)–4(I) showing the images obtained by the conventional image processing process that provides the starting point of the image processing of the present invention.

In the present invention, the size of the optical beam is set at the beginning of operation such that the exposed dots have a size larger than the conventional size shown in FIGS. 1(A)–1(I) or FIGS. 2(A)–2(I). Thus, FIGS. 3(A)–3(I) show the example of the patterns corresponding to the patterns of FIGS. 1(A)-1(I) wherein the size of each dot is increased. It should be noted that the smaller circles shown with hatching represent the actual beam spot and the squares indicated by the thick line represent schematically the picture element formed as a result of exposure of the beam spot. On the other hand, FIGS. 4(A)-4(I) show the corresponding patterns formed by the background exposure process. Similar to the case of the image exposure process of FIGS. 3(A)-3(I), the beam spot size is increased.

In the images of FIGS. 3(A)-3(I), it will be noted that the region or gap between adjacent dots is naturally decreased as a result of the increased size of the dots. Such a decrease in the size of the gap appears particularly conspicuous in the images including a plurality of oblique lines such as the image of FIG. 3(D) or in the images wherein the dot is surrounded laterally and vertically by other dots as shown in FIG. 3(B). A similar problem appears also in the background exposure images as shown in FIGS. 4(A)-4(E). In the background exposure process, the foregoing narrowing of the gap becomes even conspicuous. In the present invention, such unwanted narrowing of the gap appearing in particular image patterns is eliminated by selectively reducing the size of the beam spot or intensity of the optical beam in response to the pattern of the dots. In addition to the foregoing problems, the images shown in FIGS. 3(A)-3(I) or FIGS. 4(A)-4(I) has the problem of bulging of the node in the cross image as already described.

Figure 2A:
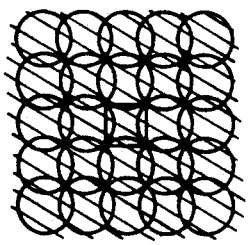
FIGS. 2(A)–2(I) are diagrams showing various patterns of dots corresponding to FIGS. 1(A)–1(I) and formed according to the conventional image forming method that is undertaken in the background exposure mode.
Figure 2B:
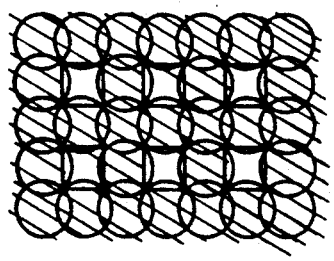
Figure 2C:
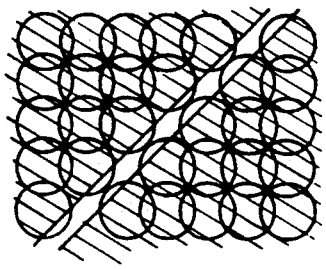
Figure 2D:
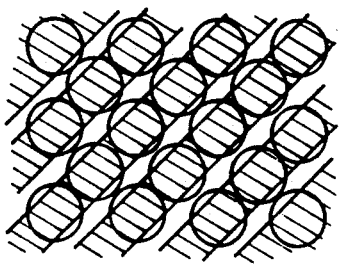
Figure 2E:
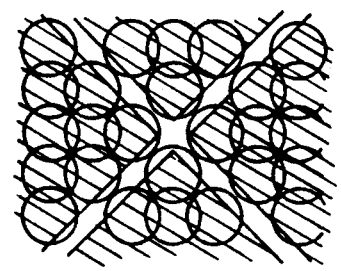
Figure 2F:
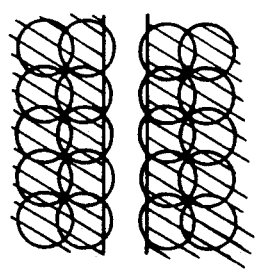
Figure 2G:
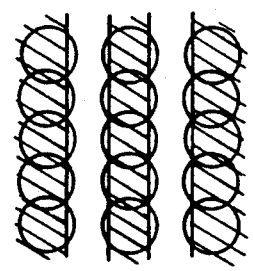
Figure 2H:
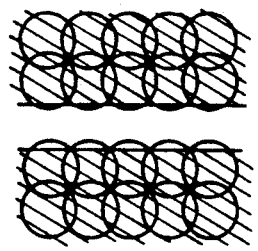
Figure 2I:
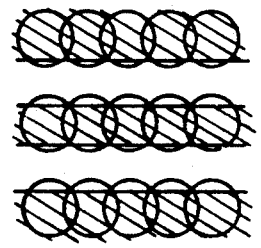
Figure 4A:
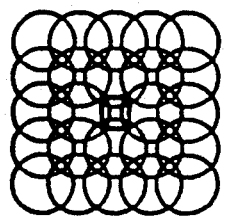
FIGS. 4(A)–4(I) are diagrams showing various patterns of dots corresponding to FIGS. 3(A)–3(I) and formed by the foregoing another, conventional image forming method in the background exposure mode.
Figure 4B:
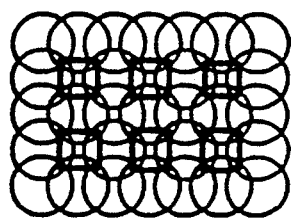
Figure 4C:
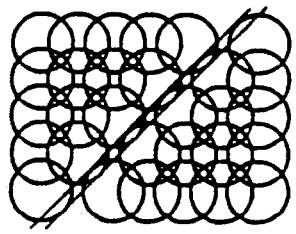
Figure 4D:
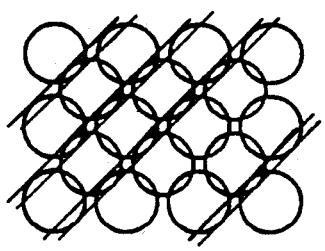
Figure 4E:
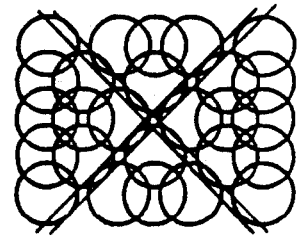
Figure 4F:
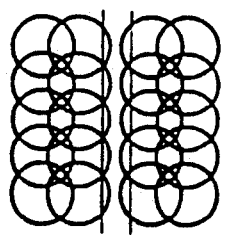
Figure 4G:
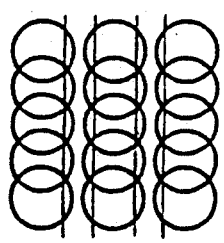
Figure 4H:
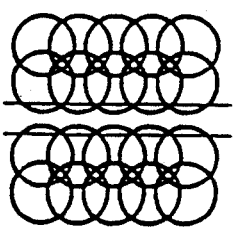
Figure 4I:
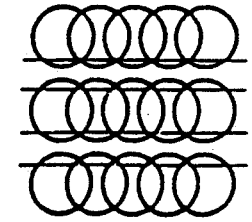
Figure 5:
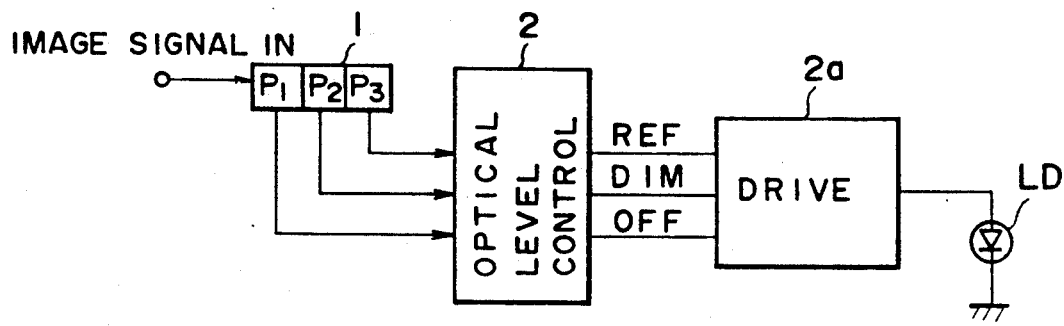
FIG. 5 is a block diagram showing the construction of the image processing system according to a first embodiment of the present invention.

FIG. 5 shows the block diagram of the image processing system used for eliminating the foregoing problems. It should be noted that the system of FIG. 5 is designed for use in combination with the laser beam scanning system and forms a part of a laser driver circuit.

Referring to FIG. 5, image signals corresponding to three consecutive picture elements aligned in the horizontal scanning direction are supplied to a shift register 1 as signals P1, P2 and P3. The shift register 1, in turn, produces output signals indicative of the image signals P1, P2 and P3 held in each cell, and the output signals are directed to a drive controller 2 that produces a control signal for a driver 2a. The driver 2a in turn produces a driving signal of a laser diode LD. Thereby, the magnitude of the output control signal of the drive controller 2 is changed in three steps, i.e. the reference level, the diminished level and the shut off level, in response to the combination of the image signals P1, P2 and P3. It should be noted that the three lines connecting the controller 2 to the drive 2a does not mean that there are three physically distinct lines but does indicate the three levels of the control signal.

The following TABLE I shows the level of the control signal produced by the drive controller 2 for each combination of the image signals P1, P2 and P3, wherein there appear five such combinations.

TABLE I

| CASE | A | B | C | D | E |
|---|---|---|---|---|---|
| P1 | 1 | 1 | 1 | 1 | 0 |
| P2 | 1 | 1 | 0 | 0 | 1 or 0 |
| P3 | 1 | 0 | 1 | 0 | 1 or 0 |
| LEVEL | REF | REF | DIM | REF | OFF |

In the case (A), all of the aimed picture element P1, an adjacent picture element P2 located adjacent to the picture element P1 in the horizontal scanning direction, and the picture element P3 located adjacent to the picture element P2 in the horizontal scanning direction at the side away from the picture element P1, are in the state 1, indicating that the exposure of dots is made for all of the picture elements P1, P2 and P3. Such pattern appears in FIGS. 3(H) and 3(I) or FIGS. 4(H) and 4(I). In this state, the drive controller 2 produces the output control signal such that the control signal for the aimed picture element P1 assumes the reference level REF. It should be noted that the reference level of the driving signal is set to increase the size of the beam spot as compared to the conventional case shown in FIGS. 3(A)-3(I) or FIGS. 4(A)-4(I). Thereby, a dot having a reference size is formed on the recording medium such as a photosensitive drum of printer in correspondence to the picture element P1. This reference size is naturally larger than the dot size for the conventional case.

In the case (B), the image signals for the aimed picture element P1 and the adjacent picture element P2 are in the state 1 while the image signal for the picture element P3 is in the state 0. In other words, two successive dots are formed in the three successive picture elements P1, P2 and P3. In this case, the drive controller 2 produces the control signal with the reference level and the picture element having the reference size is exposed in correspondence to the picture element P1.

In the case (C), the image signal for the aimed picture element P1 assumes the level 1, the image signal for the adjacent picture element P2 assumes the level 0, and the image signal for the adjacent picture element P3 assumes the level 1. In other words, there are two exposed picture elements with an unexposed picture element intervening therebetween. Such an image pattern is included in FIGS. 3(B), 3(D)-3(E) and 3(G) or in FIGS. 4(B) and 4(C)-4(G). In this case, the drive controller 2 reduces the level of the output control signal for the aimed picture element P1 to a level DIM. In response to the reduced level of the output drive signal, the driver 2a of the laser diode LD changes either the intensity or the size of the laser beam produced by the laser diode LD and accordingly, the size of the dot exposed on the recording medium such as the photosensitive drum is decreased. Thereby, the size of the exposed dot is reduced to about 90-50% of the reference size.

The case (D) represents the case where the image signal for the aimed picture element P1 is 1 while the image signals for the other picture elements P2 and P3 are all 0. Such a pattern appears in the isolated dot as shown in FIG. 3(A) and the size of the exposed dot is set at the reference size.

Finally, the case (E) represents the case where the image signal for the aimed picture element P1 is 0. In this case, the beam for the aimed picture element P1 is shut off irrespective of whether the image signals for the other picture elements P2 and P3 are 1 or 0.

Figure 6A:
FIGS. 6(A)–6(I) are diagrams showing various patterns of dots formed by the system of FIG. 5 in the image exposure mode.
Figure 6B:
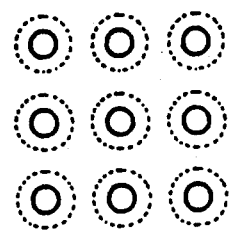
Figures 6C, 6D, 6E:
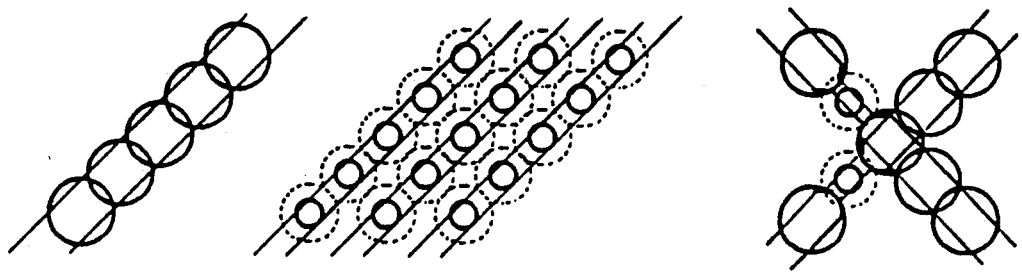
Figure 6F:
Figure 6G:
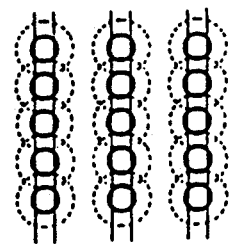
Figure 6H:
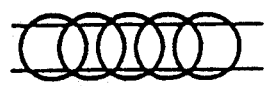
Figure 6I:
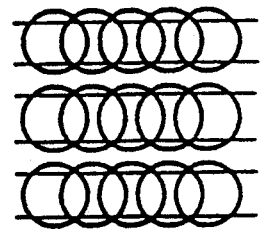

FIGS. 6(A)-6(I) show the result of the image pattern obtained as a result of the foregoing control for the case of the image exposure process. As can be seen, the size of the exposed dots is decreased in the pattern of FIGS. 6(B), 6(D), 6(E) and 6(G) while kept at the reference size in other patterns. As can be seen clearly, the gap separating the oblique lines or vertical lines is increased for the patterns of FIGS. 6(D) and 6(E). Further, the separation between the dots is increased in the pattern of FIG. 6(B). Further, the size of the dots adjacent to the node where two oblique lines cross each other in the pattern of FIG. 6(E) is decreased to minimize the bulge at the node in the recorded image. On the other hand, the horizontal lines shown in FIGS. 6(H) and 6(I) remain the same as in the horizontal lines of FIGS. 3(H) and 3(I).

Figure 7A:
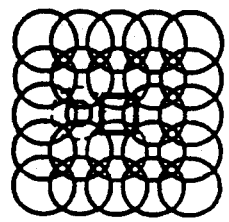
FIGS. 7(A)–7(I) are diagrams showing various patterns of dots formed by the system of FIG. 5 in the background exposure mode.
Figure 7B:
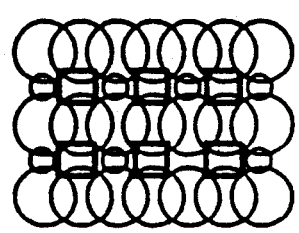
Figure 7C:
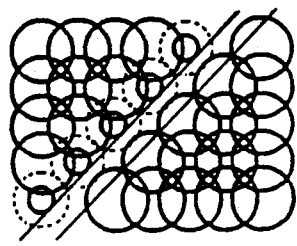
Figure 7D:
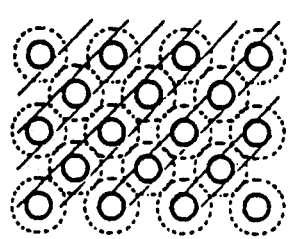
Figure 7E:
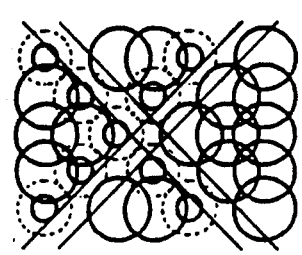
Figure 7F:
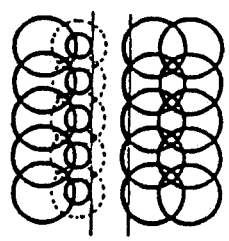
Figure 7G:
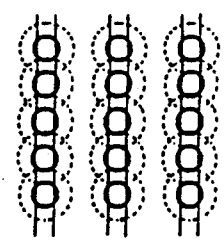
Figure 7H:
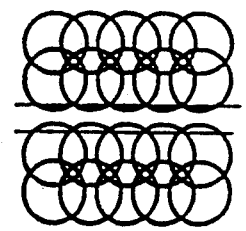
Figure 7I:
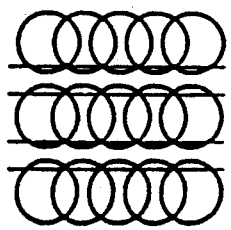

FIGS. 7(A)–7(I), on the other hand, shows the case of the background exposure process wherein the control of the dot size shown in TABLE I is applied. Thus, the size of the unexposed dots in the pattern of FIG. 7(A) or FIG. 7(B) is increased as compared to the patterns of FIG. 4(A) or FIG. 4(B) by decreasing the size of the dots that is formed by the exposure of the recording medium by the optical beam. Similarly, the separation between the oblique lines or vertical lines in FIGS. 7(C)–7(E) is increased as compared to the corresponding patterns of FIGS. 4(C)–4(E) as a result of the decrease in the exposed dot size. Further, the node of the cross image of FIG. 7(E) is shown clearly in contrast to the case of FIG. 4(E) where there is no such image processing. It should be noted that, in the image of FIG. 4(E), the node tends to be shown imperceptible because of the excessively small size of the unexposed part forming the node.

With such a control in the size of the dots in response to the image pattern, the quality of the recorded image is significantly improved. It should be noted that the steps that can be seen in the cross images of FIGS. 6(E) and 7(E) are caused because of the exaggeration to illustrate clearly the effect of the present invention and are not conspicuous in the actually printed image.

Next, a second embodiment of the present invention will be described with reference to FIG. 8. The present embodiment is designed to apply the forgoing control of the optical beam for solid state optical scanning heads such as the LED array, LCD shutter array, FL dot array, and the like. In this embodiment, too, the picture element P1 represents the aimed picture element and the shift register 1 is used for storing the image information of three consecutive picture elements P1, P2 and P3. Similar to the foregoing embodiment, the picture elements P1, P2 and P3 are aligned in the horizontal scanning direction and the shift register 1 is divided into cells respectively corresponding to the picture element P1, P2 and P3. The content of the cells is updated upon incoming of the image signals of one horizontal scanning line as usual. Thereby, the image signal is passed consecutively from the picture element P1 to the picture element P2, and from the picture element P2 to the picture element P3.

Figure 8:
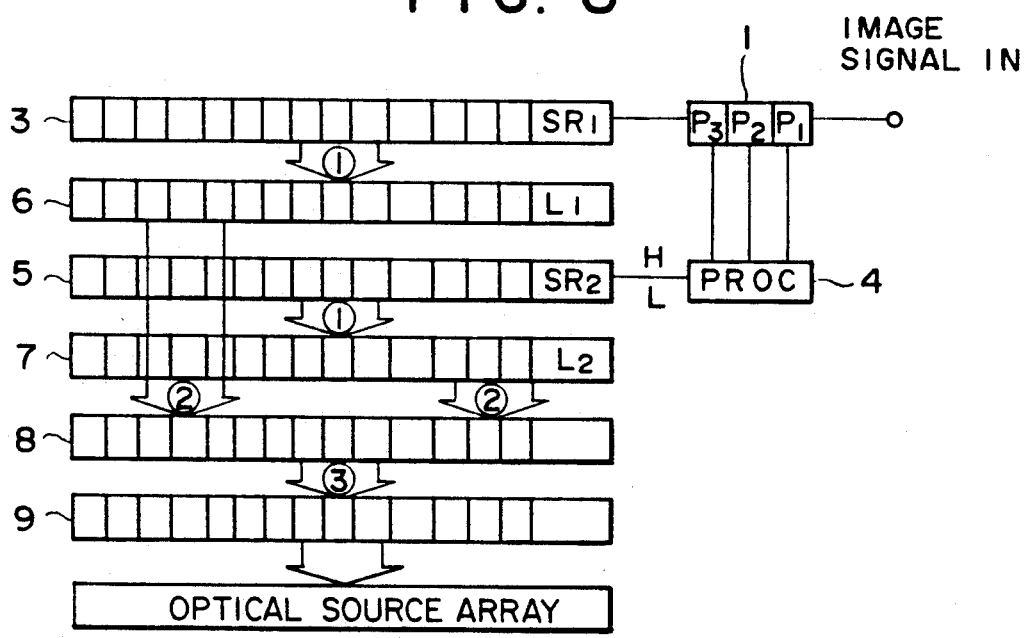
FIG. 8 is a block diagram showing the construction of the image processing system according to a second embodiment, of the present invention.

In the present embodiment, the content of the shift register 1 is supplied to a first shift register 3 designated as SR1 in FIG. 8 consecutively. The shift register 3 is divided into a number of cells corresponding to each picture element of one horizontal scanning line and thus, the image signals of the picture elements included in the horizontal scanning line are passed consecutively along the cell of the shift register 3 and held in the corresponding cell of the shift register 3. On the other hand, the image signals for the three consecutive picture elements P1, P2 and P3 stored in the shift register 1 are supplied to a first processing part 4 wherein a logic operation is performed based upon the combination of the image signals.

The first processing part 4 produces a logic output signal as a result of the logic operation for each aimed picture element, and directs the same to a second shift register 5 designated in FIG. 8 as SR2. The second shift register is also divided into a number of cells corresponding to the picture elements of the horizontal scanning line, and passes the output of the first processing part 4 consecutively from one cell to the next with the timing identical with the transfer of the image data in the shift register 3.

Figure 9:
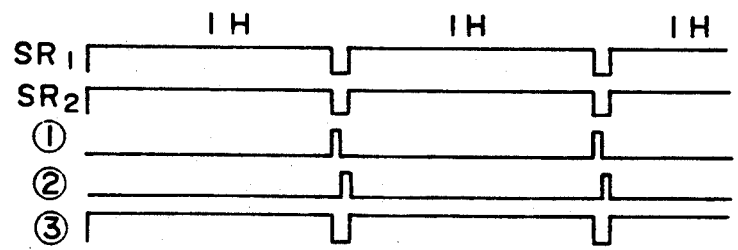
FIG. 9 is a timing chart showing the operation of the system of FIG. 8.

Further, there is provided a first latch 6 in correspondence to the shift register 3 and a second latch 7 in correspondence to the shift register 5 for latching the content of each cell of the shift registers with a predetermined timing corresponding to the completion of storage of one horizontal line of image signals as shown in FIG. 9. In FIG. 9, each interval designated as 1H represents the duration needed for storing one horizontal line in the shift registers 3 and 5. It should be noted that the timing of transfer of the content of the shift registers 3 and 5 to the latches 6 and 7 is indicated by the waveform 1.

After the transfer to the latch is completed, the content of the latches 6 and 7 are transferred to a processor 8 in response to a timing signal indicated in the waveform 2 of FIG. 9. The processor 8 is also divided into a number of cells corresponding to the picture elements included in one horizontal scanning line, and performs a logic operation to be described hereinbelow in each cell. In response to the result of operation, the processor 8 produces output logic data and the output data thus produced is transferred to a device driver 9 that is also divided into a number of cells corresponding to the picture elements included in the horizontal scanning line. In response to the output logic data, the device driver 9 produces an output drive signal that drives the LED o other light emitting device. For this purpose, the device driver 9 is also divided into a number of cells that corresponds to the picture element of the horizontal line. Thus, in response to the output of the device driver 9, the LEDs for the designated picture elements in the horizontal scanning line are energized.

The following TABLE II shows the output of the latch 7 for various combination of the input image signals to the processor 4.

TABLE II

|    | a | b | c | d | e      |
|----|---|---|---|---|--------|
| P1 | 1 | 1 | 1 | 1 | 0      |
| P2 | 1 | 1 | 0 | 0 | 1 or 0 |
| P3 | 1 | 0 | 1 | 0 | 1 or 0 |
| L2 | L | L | H | L | L      |

Thus, the output L2 of the latch 7 changes its state in response to the input pattern of the image signals for three consecutive picture elements P1, P2 and P3 in a manner somewhat similar to the first embodiment. It should be noted that there are five different combinations a - e.

Further, the following TABLE III shows the operation of the processor 8 in response to the input logic signals thereto.

TABLE III

|       | f   | g   | h   |
|-------|-----|-----|-----|
| L1    | 1   | 1   | 0   |
| L2    | H   | L   | L   |
| LEVEL | DIM | REF | OFF |

Thus, in response to the combination of the output of the latch 6 and the latch 7, the driver 9, controlled in response to the output of the processor 8, drives the light emitting device such as LED with three distinct states, DIM, REF and OFF as shown. Similar to the foregoing case, the level REF represents the standard optical beam intensity, the level DIM represents the diminished intensity, and OFF represents the deenergized state. The resulting image pattern becomes identical with the pattern shown in FIGS. 6(A)–6(I) and FIGS. 7(A)–7(I). Of course, the foregoing control shown in TABLEs II and III is made for each picture element included in the horizontal scanning line, i.e. the aimed picture element is moved by one picture element along the line each time the aimed picture element is detected or recorded. Thus, the forgoing control is made for each cell in the latches 6 and 7.

In the foregoing first and second embodiments, it should be noted that the aimed picture element is not limited to the picture element P1. The other picture element P3 at the other end of the three picture elements also may be selected with substantially an identical result. Thus, it should be noted that the essential feature of the present invention exists in the point that the intensity of the optical beam is diminished selectively for an aimed picture element at an end of consecutive three picture elements aligned in a row, in response to the content of the other two picture elements.

Next, a third embodiment of the present invention will be described with reference to FIGS. 10, 11, 12(A)–12(I), and 13(A)–13(I). In this embodiment, too, it is assumed that the black picture element is recorded on the white background with an increased dot size in the standard or reference state as described with reference to FIGS. 3(A)–3(I) or FIGS. 4(A)–4(I).

Figure 10:
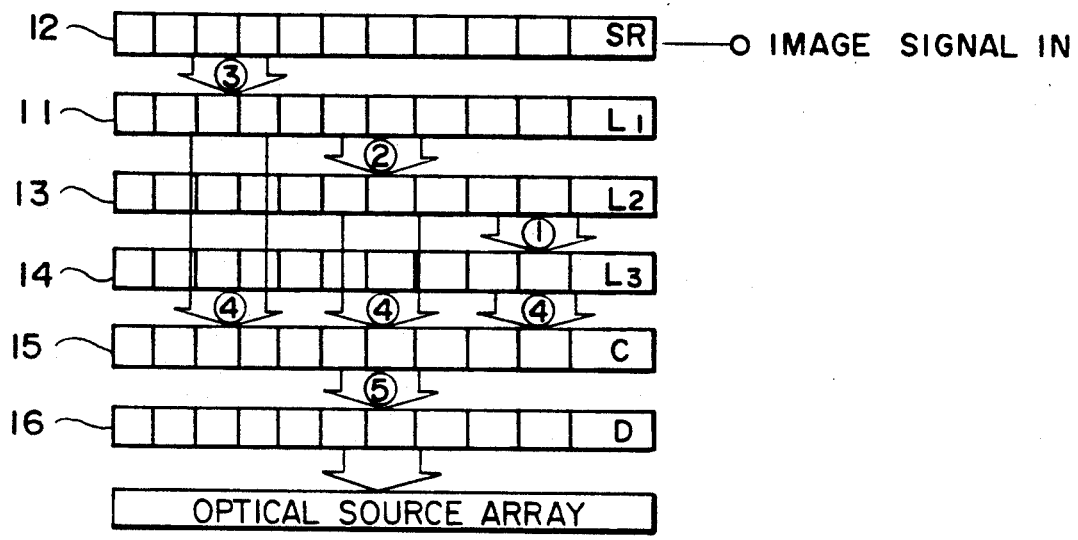
FIG. 10 is a block diagram showing the construction of the image processing system according to a third embodiment of the present invention.

FIG. 10 shows the construction of the third embodiment. Similar to the second embodiment, the present embodiment is suitable for use in the solid state optical scanning head and comprises a shift register 12 to which image signals are supplied for one horizontal scanning line. Similar to the foregoing second embodiment, the shift register 12 is divided into a number of cells corresponding to the picture elements in one horizontal scanning line 1H and the image signals for the picture elements are entered line sequentially in each cell of the shift register.

Figure 11:
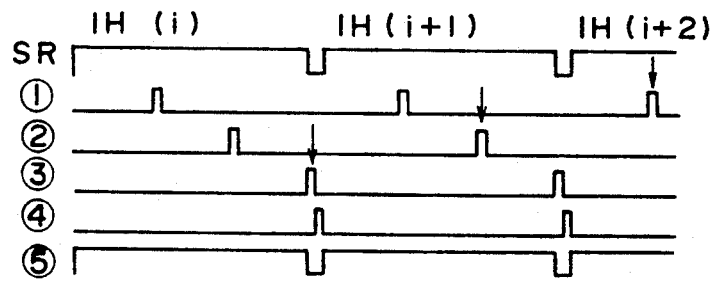
FIG. 11 is a timing chart showing the operation of the system of FIG. 10.

When the supply of image signals for the i-th horizontal scanning line is completed in the shift register 12, the image signals are transferred from the shift register 12 to a first latch 11 in response to a timing signal shown by the arrow in the waveform 3 of FIG. 11. Further, the content of the latch 11 is transferred to a second latch 13 in response to the timing shown by the arrow in by the waveform 2. Further, the content of the latch 13 is supplied to a third latch 14 in response to a timing signal shown by the arrow in the waveform 1. It should be noted that the timing given by the waveform 3 coincides to the end of the i-th horizontal scanning line and the beginning of the next, (i+1)th horizontal scanning line, the timing given by the waveform 2 is in the interval of the (i+1)th horizontal scanning line, and the timing given by the waveform 1 is included in the next, (i+2)th horizontal scanning line but later than the timing of the waveform 1.

After the transfer of the image signals to the latch 11 with the timing of the waveform 3, the shift register 12 is supplied with the image signals for the (i+1)th horizontal scanning line and the image signals thus entered are transferred to the latches 11, 13 and 14 similar to the foregoing case. Further, after the transfer of the image signals for the (i+1)th line to the latch 11, the image signals for the (i+2)th line are entered into the shift register 12, and transferred to the latches 11, 13 and 14 with the timing as already described.

With the foregoing processes, it should be noted that the third latch 14 holds the image signals for the first, i-th line, the second latch 13 holds the image signals for the second, (i+1)th line, and the first latch 11 holds the image signals for the last, (i+2)th line. As already noted, each latch 11, 13 or 14 has a number of cells in correspondence to the picture elements in the horizontal scanning line, and thus, the cells of the latches 11, 13 and 14 aligned in the vertical scanning direction at the same column hold the image information for the i-th line, (i+1)line and the (i+2) line, respectively.

The content of the latches 11, 13 and 14 are then transferred to a processor 15 with the timing shown in FIG. 11 by the waveform 4 corresponding to the end of one horizontal scanning line, and the processor 15 produces a control signal in response to the combination of logic states of the latches 11, 13 and 14 as will be described hereinbelow. Similar to the latches 11, 13 and 14, the processor 15 has a number of cells corresponding to the picture elements in the horizontal scanning line, and produces output drive signals that are directed to corresponding light emitting elements forming an array 16 corresponding to the horizontal scanning line, in response to a timing signal shown in the waveform 5 of FIG. 11.

TABLE IV shows the operation that the processor array 15 performs. As shown in TABLE IV, the processor changes the value of the control signal that controls the light emitting array 16 in response to the combination of the content of the three consecutive picture elements aligned in the vertical scanning direction. Similar to the foregoing notation, the data "1" represents the black dot while the data "0" represents the white dot for each picture element. In TABLE IV, L1 designates the content of the latch 11 for a picture element in the i-th line, L2 designates the content of the latch 13 for a picture element in the (i+1)th line and aligned vertically to the picture element of L1, and L3 designates the content of the latch 14 for a picture element in the (i+2)th line and aligned vertically to the picture elements of L1 and L2.

TABLE IV

| | a | b | c | d | e |
|---|---|---|---|---|---|
| L1 | 1 | 1 | 1 | 1 | 0 |
| L2 | 1 | 1 | 0 | 0 | 1 or 0 |
| L3 | 1 | 0 | 1 | 0 | 1 or 0 |
| LEVEL | REF | REF | DIM | REF | OFF |

Referring to TABLE IV, the case (a) shows the case where all the three consecutive picture elements aligned in the vertical scanning direction have the value 1 indicating black dots. In this case, the light emitting device for the aimed picture element P1 held in the latch L1 is controlled to produce a strong optical beam of the reference level. The case (b) indicates a pattern wherein the aimed picture element P1 at the latch L1 and the adjacent picture element P2 held in the latch L2 are black while the picture element P3 is white. In this case, the controller 15 controls the light emitting device to produce the optical beam with the reference intensity level.

The case (c) indicates a pattern wherein the aimed picture element P1 at the latch L1 and the picture element P3 at the latch L3 form black dots that sandwich vertically a white dot of the picture element P2 held at the latch L2. It should be noted that improvement of the image recording of such a pattern is exactly the subject matter of the present invention, and the present embodiment achieves the object by diminishing the size of the black dot of the picture element P1. This may be achieved by reducing the intensity of the optical beam. Of course, any other means to reduce the size of the beam spot may be employed for this purpose. When reducing the intensity or power of the optical beam, the reduced intensity may be set to about 0.5–0.9 of the reference intensity.

The case (d) corresponds to the image pattern wherein the aimed picture element at the latch L1 has the value 1 indicating the black dot while both the other two picture elements in the latches L2 and L3 are zero indicating white dots. In this case, the intensity of the optical beam is set to the reference level. Further, the case (e) shows the pattern wherein the aimed picture element is white. Thus, the optical beam for the aimed picture element is shut down irrespective of the combination of the content of the other two picture elements.

FIGS. 12(A)–12(I) and FIGS. 13(A)–13(I) represent the image pattern thus obtained. In the drawings, the larger circles represent the spot of the beam of the reference intensity, the smaller circles represent the spot of the beam of the diminished intensity, and the solid lines represent the contour of the spots or lines formed on a recording medium by the optical beams of which intensity is controlled as described. It should be noted that FIGS. 12(A)–12(I), represent the images obtained by the image exposure process while FIGS. 13(A)–13(I) represent the images obtained by the background exposure process.

Figure 12A:
FIGS. 12(A)–12(I) are diagrams showing various patterns of dots formed by the system of FIG. 10 in the image exposure mode.
Figure 12B:
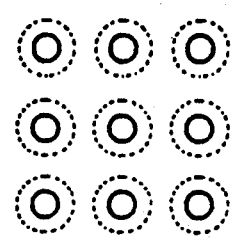
Figures 12C, 12D, 12E:
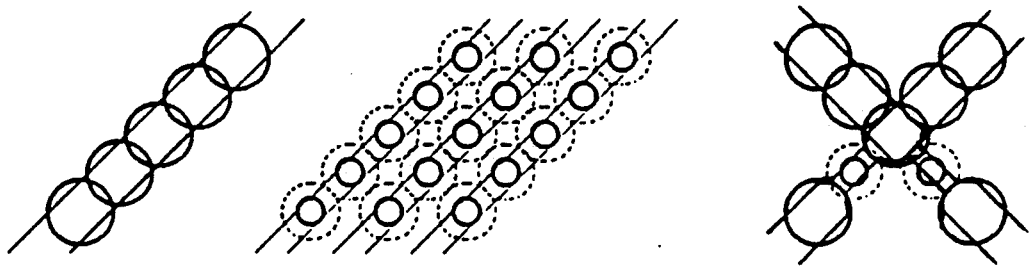
Figure 12F:
Figure 12G:
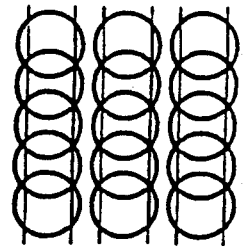
Figure 12H:
Figure 12I:
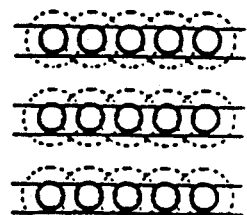

It should be noted that there is substantially no change in the vertical lines shown in FIGS. 12(F) and 12(G) or FIGS. 13(F) and 13(G), while there are achieved improvements in the isolated dot patterns in FIGS. 12(B) and 13(B), oblique lines in FIGS. 12(D) and 12(B), cross patterns in FIGS. 12(E) and 13(E), and horizontal lines in FIGS. 12(I) and 13(I). It should be noted that the stepped necks formed in the pattern of FIG. 12(E) or FIG. 13(E) are merely for the purpose of illustration and do not cause problems in the actually recorded images.

Figure 14:
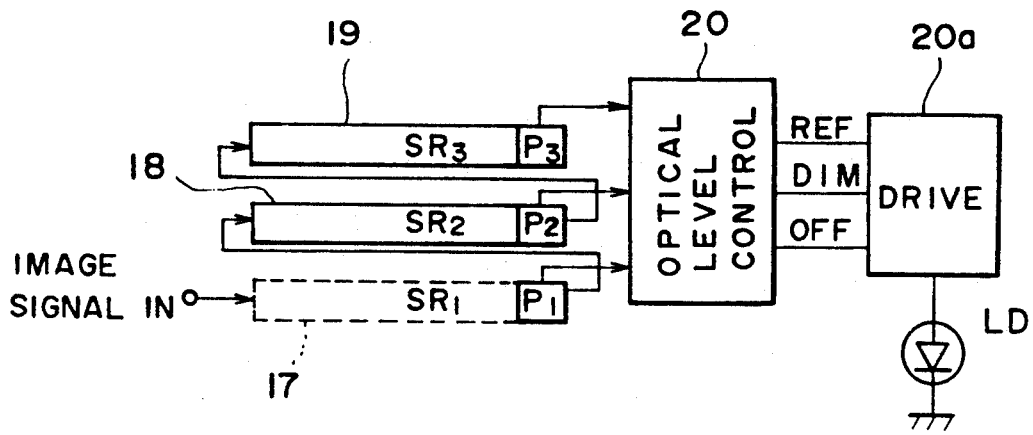
FIG. 14 is a block diagram showing the construction of the image processing system according to a fourth embodiment of the present invention.

Next, a fourth embodiment of the present invention will be described with reference to FIG. 14 showing the image processing system suitable for use in the image recoding system of the raster-scanning type. In FIG. 14, the aimed picture element is represented by P1, and the other two adjacent picture elements are represented by P2 and P3. In the present embodiment, the three consecutive picture elements P1–P3 are aligned in the vertical scanning direction.

In operation, the image signals are received by a shift register 17 including therein a number of cells corresponding to the picture elements in one horizontal scanning line. Thus, image signals are passed from one cell to the next cell in the shift register 17 and thereby an image for one horizontal scanning line is stored in the shift register 17. Further, the image signals are fed to a next shift register 18 also including a number of cells in correspondence to one horizontal scanning line, and the image signals are passed from one cell to the next cell in the shift register 18. Thus, it will be under stood that when one horizontal scanning line for the i-th line is stored in the shift register 18, the shift register 17 stores the next, (i+1)th scanning line. Further, the image signals are passed through the shift register 18 are fed to a third shift register 19 that also includes the cells in correspondence to the picture elements in one horizontal scanning line. Similar to the shift registers 17 and 18, the image signals are passed from one cell to the next in the shift register 19.

It should be noted that, when the storage of the i-th horizontal scanning line in the shift register 19 is completed, the shift registers 18 and 17 store respectively the (i+1)th horizontal scanning line and the (i+2)th horizontal scanning line. Thus, the cells in the shift registers 17, 18 and 19 corresponding to the same column store the image signals of the three consecutive picture elements P1, P2 and P3 that are aligned in the vertical scanning direction.

In correspondence to the picture elements P1, P2 and P3, there are provided a processor 20 that produces an output control signal for controlling the laser diode according to the combination of logic states of the picture elements P1, P2 and P3, and the output of the processor 20 is supplied to a laser diode driver 20a that drives a laser diode LD in response to the control signal from the processor 20.

The following TABLE V shows the logic operation carried out in the processor 20. Similar to the previous tables, the logic value "1" represents the black dot, the logic value "0" the white dot. Further, the output level of the laser diode designated as REF represents the strong reference level, the level DIM represents the diminished level, and the level OFF represents the shutdown of the optical beam.

TABLE V

|   | a | b | c | d | e |
|---|---|---|---|---|---|
| P1 | 1 | 1 | 1 | 1 | 0 |
| P2 | 1 | 1 | 0 | 0 | 1 or 0 |
| P3 | 1 | 0 | 1 | 0 | 1 or 0 |
| LEVEL | REF | REF | DIM | REF | OFF |

This control process is substantially identical with the control process of TABLE IV, and the image patterns shown in FIGS. 12(A)–12(I) or FIGS. 13(A)–13(I) are obtained.

In the third and fourth embodiments described heretofore, it should be noted that the aimed picture element is not limited to the picture element P1 but the picture element P3 at the other end of the three consecutive picture elements may be used as well for the aimed picture element. The important feature of the present embodiments exists in the point that three consecutive picture elements aligned in the vertical scanning direction are used for the image processing such that the dot size at one end of the picture element array is changed in response to the content of the other two picture elements.

Next, a fifth embodiment of the present invention will be described. In this embodiment, too, the exposed dot image is set to have a size that is increased similar to the dots shown in FIGS. 2(A)–2(I) or FIGS. 3(A)–3(I).

Figure 15:
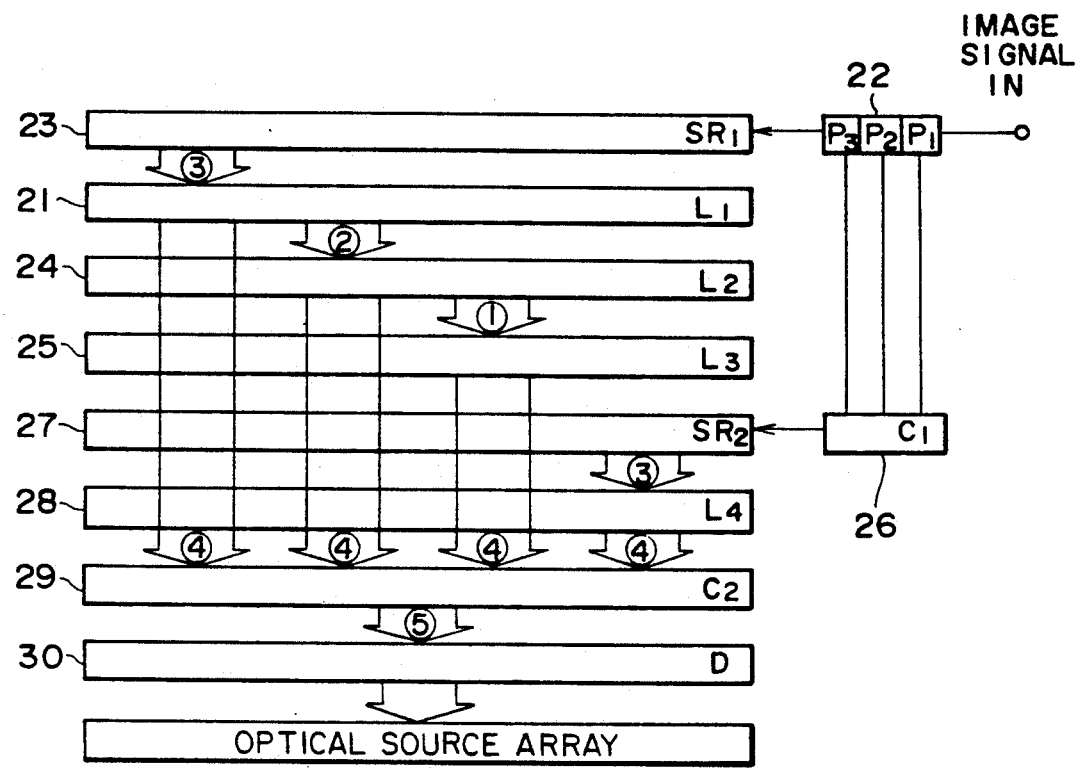
FIG. 15 is a block diagram showing the construction of the image processing system according to a fifth embodiment of the present invention.

FIG. 15 shows the construction of the image processing system employed in the present embodiment. This system is designed to control the solid state optical scanning head similar to the second and third embodiments, and has a shift register 22 including therein three cells for three consecutive picture elements P1, P2 and P3.

Referring to FIG. 15, the image signals are supplied to the shift register 22 wherein the image signals are passed from one cell to the next consecutively. Further, the image signals that have passed through the shift register 22 are supplied consecutively to a shift register 23. Upon completion of the storage of image signals for one complete horizontal scanning line (i-th line), the image signals are transferred from the shift register 23 to a latch 21 with a timing signal shown by the arrow in the waveform 3 of FIG. 16.

Figure 16:
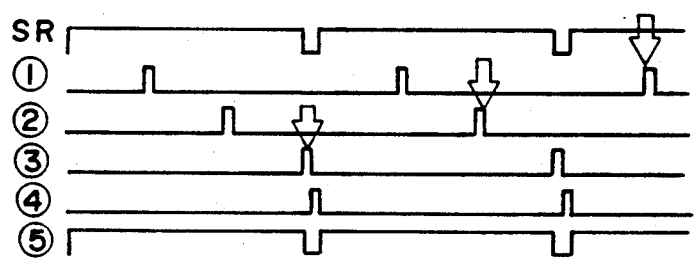
FIG. 16 is a timing chart showing the operation of the system of FIG. 15.
Figure 18A:
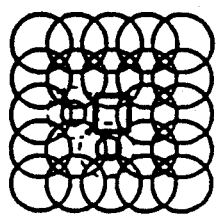
FIGS. 18(A)–18(I) are diagrams showing various patterns of dots formed by the system of FIG. 15 in the background exposure mode.
Figure 18B:
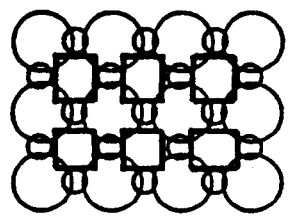
Figure 18C:
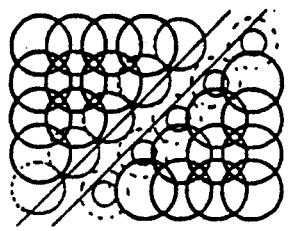
Figure 18D:
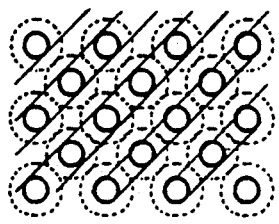
Figure 18E:
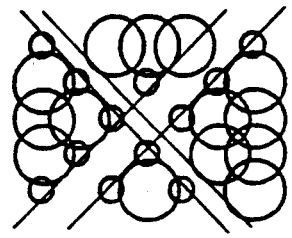
Figure 18F:
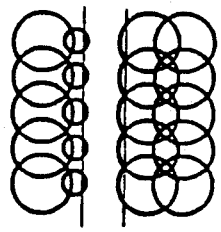
Figure 18G:
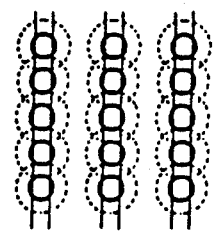
Figure 18H:
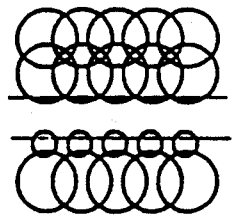
Figure 18I:
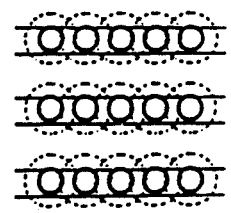

The latch 21, in turn, transfers the content to a second latch 24 in response to a timing signal shown by an arrow in the waveform 2 of FIG. 16 while reading the content of the next, (i+1)th horizontal scanning line via the shift register 22. Further, the latch 24 transfers the content to a third latch 25 in response to a timing signal shown by the arrow in the waveform 1 of FIG. 16. Thereby, the latch 25 stores the image signals for the foregoing i-th horizontal scanning line, the latch 24 stores the image signals for the (i+1)th horizontal scanning line, and the latch 21 stores the (i+2)th horizontal scanning line that the shift register 23 has read lastly.

While sending the image signals consecutively to the shift register 23, the shift register 22 sends the content of the picture elements P1, P2 and P3 to a processor 26 in the form of parallel data, and the processor 26 produces output logic data in response to the combination of the content of the picture elements P1, P2 and P3. The content of the processing will be described later. The output logic data of the processor 26 is then supplied to a shift register 27 and subsequently transferred to a latch 28 in response to the timing signal shown in the waveform 3 of FIG. 16.

Upon completion of storage of data in the latches 21, 24, 25 and 28, the contents of these latches are transferred to another processor 29 in response to a timing signal shown in FIG. 16 by the waveform 4. The processor 29 performs a logic operation to be described later and produces an output control signal that is supplied to a driver 30 for driving the light emitting devices. Thereby, the system of FIG. 15 changes the size of the beam spot of optical beams produced by the light emitting device array in response to the pattern of the image to be recorded.

It should be noted that each of the shift registers and latches, 21 and 23-30, are divided into a number of cells corresponding to the picture elements included in one horizontal scanning line similar to the foregoing embodiments. Thus, in each column of the cells in the latches 21, 24 and 25, the image information is aligned in the order of (i+2)th line, (i+1)th line and i-th line.

The following TABLE VI shows the content of the logic operation achieved by the processor 26. Similar to the previous tables, data "1" designates the black dot, data "0" designates the white dot, data "L" designates the logic low level state of the output signal L4, and the data "H" designates the logic high level state of the output signal L4.

TABLE VI

|    | a | b | c | d | e      |
|----|---|---|---|---|--------|
| P1 | 1 | 1 | 1 | 1 | 0      |
| P2 | 1 | 1 | 0 | 0 | 1 or 0 |
| P3 | 1 | 0 | 1 | 0 | 1 or 0 |
| L4 | L | L | H | L | L      |

Referring to TABLE VI the case (a) represents an image pattern wherein all the picture elements P1-P3 are black, while the case (b) represents an image pattern in which two consecutive picture elements including the aimed picture element P1 are black and the other picture element P3 alone is white. In both of these cases, the logic output L4 assumes the logic level L. On the other hand, the case (c) represents an image pattern wherein the black dots of the aimed picture element P1 and the other picture element P3 sandwich the white picture element P2. It should be noted that such a pattern is exactly the pattern that is subjected to the image processing of the present invention. Thus, in this case, the processor 26 produces the output logic signal L4 with the high level state. Further, the case (d) represents the pattern wherein only the aimed picture element P1 forms a black dot while the other two picture elements P2 and P3 are all white. In the case (e), on the other hand, the aimed picture element is white. In both of the case (d) and the case (e), the output of the processor 26 is set to the logic level L.

The following TABLE VII shows the content of operation carried out by the processor 29. In the TABLE VII, L1 represents the output of the latch 21, L2 represents the output of the latch 24, L3 represents the output of the latch 25, and L4 represents the output of the processor 26.

TABLE VII

|       | f   | q   | h   | i   | j   | k   | l   | m   | n      |
|-------|-----|-----|-----|-----|-----|-----|-----|-----|--------|
| L1    | 1   | 1   | 1   | 1   | 1   | 1   | 1   | 1   | 1      |
| L2    | 1   | 1   | 0   | 0   | 1   | 1   | 0   | 0   | 1 or 0 |
| L3    | 1   | 0   | 1   | 0   | 1   | 0   | 1   | 0   | 1 or 0 |
| L4    | H   | H   | H   | H   | L   | L   | L   | L   | H or L |
| LEVEL | DIM | DIM | DIM | DIM | REF | REF | DIM | REF | OFF    |

As can be seen from the above table, there are nine difference cases i.e., case (f) - case (n), wherein the output level of the optical beam is reduced only when the logic state of the output signal L4 is H (case (f) - case (i)) or when both picture elements held in the latches 21 and 25 are black while the picture element held in the latch 24 and intervening therebetween is white (case (1)). Similar to the foregoing embodiments, the reduction of power or intensity of the optical beam may be achieved by setting the output power to about 0.5-0.9 of the power for the case of the reference intensity.

FIGS. 17(A)-17(I) and FIGS. 18(A)-18(I) are diagrams showing the image patterns obtained by the processing of the present embodiment. It should be noted that the image processing of the present embodiment is achieved by selectively diminishing the size of the exposed black dot at the aimed picture element based upon the dot pattern for the three consecutive picture elements aligned in the horizontal scanning direction and further based on the dot pattern for the three consecutive picture elements aligned in the vertical scanning direction.

As can be seen in the drawing, the improvement in the picture quality of image pattern is achieved for all of the patterns of FIGS. 17(B), 17(D), 17(E), 17(G) and 17(I) that include isolated dots, oblique lines, a cross, vertical lines, and the horizontal lines by selectively reducing the dot size of the picture elements. On the other hand, the images such as the single dot of FIG. 17(A), the single oblique line of FIG. 17(C), the single vertical line of FIG. 17(F), and the single horizontal line of FIG. 17(I) are recorded with the bold, reference size of dot. In the background exposure process of FIGS. 18(A)-18(I), too, the isolated dots, oblique lines, cross, vertical lines, and the horizontal lines are recorded with increased size, thus improving the picture quality.

Figure 19:
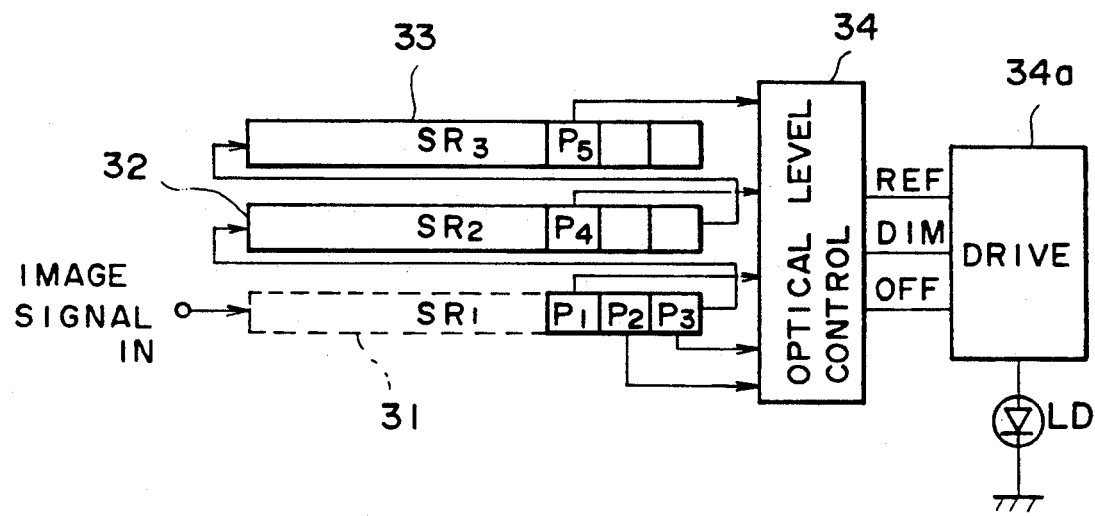
FIG. 19 is a block diagram showing the construction of the image processing system according to a sixth embodiment of the present invention.

Next, a sixth embodiment of the present invention will be described with reference to FIG. 19 showing the construction of the image processing system. The present embodiment is designed for use in the image recording apparatus that forms an image by scanning a laser beam according to a raster-scan process.

Referring to FIG. 19, the image signals are supplied consecutively to a shift register 31 having a number of cells corresponding to the picture elements in one horizontal scanning line. As usual, the image signals are passed from one cell to the next in the shift register 31, thus passing though the shift register. Particularly, there are three consecutive cells for three consecutive picture elements P1, P2 and P3 wherein the picture element P1 represents the aimed picture element.

The image signals passed through the shift register 31 is then supplied to a second shift register 32 that also has a number of cells in correspondence to the cells in the register 31. Particularly, there is a cell for the picture element P4 that is aligned in the vertical scanning direction with respect to the aimed picture element P1. Further, the image signals passed through the shift register 32 is supplied to a third shift register 33 having a number of cells in correspondence to the cells in the register 32. In the register 32, there is defined a cell for the picture element P5 that is aligned with respect to the picture elements P1 and P4 in the vertical scanning direction.

The content of the picture elements P1, P2 and P3 as well as the content of the picture elements P4 and P5 are supplied to a controller 34 that controls a LD driver 34a in response to the combination of the content of the picture elements thus supplied. The following TABLE VIII shows the control performed by the controller 34.

TABLE VIII

|       | a   | b   | c   | d   | e   | f   | g   | h   | i   |
|-------|-----|-----|-----|-----|-----|-----|-----|-----|-----|
| P1    | 1   | 1   | 1   | 1   | 1   | 1   | 1   | 1   | 1   |
| P2    | 1   | 1   | 1   | 0   | 1   | 1   | 1   | 1   | 0   |
| P3    | 1   | 1   | 1   | 1   | 0   | 0   | 0   | 0   | 1   |
| P4    | 1   | 1   | 0   | 0   | 1   | 1   | 0   | 0   | 1   |
| P5    | 1   | 0   | 1   | 0   | 1   | 0   | 1   | 0   | 1   |
| LEVEL | REF | DIM | REF | REF | REF | REF | DIM | REF | REF |

|       | j   | k   | l   | m   | n   | o   | p   | q     |
|-------|-----|-----|-----|-----|-----|-----|-----|-------|
| P1    | 1   | 1   | 1   | 1   | 1   | 1   | 1   | 0     |
| P2    | 0   | 0   | 0   | 0   | 0   | 0   | 0   | 1 or 0|
| P3    | 1   | 1   | 1   | 0   | 0   | 0   | 0   | 1 or 0|
| P4    | 1   | 0   | 0   | 1   | 1   | 0   | 0   | 1 or 0|
| P5    | 0   | 1   | 0   | 1   | 0   | 1   | 0   | 1 or 0|
| LEVEL | DIM | DIM | DIM | REF | REF | DIM | REF | OFF   |

As can be seen in TABLE VIII, the level of the optical beam is reduced in the cases (b), (g), (j), (k), (l), (o) while the level of the optical beam is set at the reference level in the other cases excluding the case (q). In the case (q), the optical beam is shut off. The image pattern obtained by the present embodiment is identical with the pattern shown in FIGS. 17(A)–17(I) or FIGS. 18(A)–18(I).

In any of the foregoing first through sixth embodiments, the improvement of the picture quality of the image is achieved by setting the reference size of dots somewhat larger than the conventional size, and the size of the recorded dot is reduced selectively in response to the combination of the content of three consecutive picture elements including the aimed picture element and aligned either or both of the horizontal and vertical scanning directions. The present image processing system is particularly advantageous as it does not require complex construction of the apparatus, and can be constructed with reduced cost. Further, the present process is suitable for the image recording systems that employ a light source that has a difficulty in increasing the optical beam intensity. Further, the present process is also applicable for the case where the switching of the output level of the optical beam is made in more than three distinct levels.

Further, the present invention is not limited to the embodiments described heretofore, but various variations and modifications may be made without departing from the scope of the invention.

What is claimed is:

1. An image forming method for forming an image on a recording medium as an array of non-blank dots and blank dots a line at a time, in which a plurality of picture elements are aligned along each said line, the method comprising the steps of:
   a) for each said line, detecting a content of the picture elements for every set of three consecutive picture elements included along the line, each said set of three consecutive picture elements being defined by:
      1) an aimed picture element located at a first end of a row that includes the three consecutive picture elements and carrying a content representing a recording of a dot,
      2) a second picture element located adjacent to said first picture element, and
      3) a third picture element located adjacent to the second picture element at a second end of the row away from the first end;
   wherein the step a) of detecting the content of the picture elements is conducted while moving the aimed picture element by one picture element each time the content of the aimed picture element is detected;
   b) recording one of said non-blank and blank dots for each said set of three consecutive picture elements by:
      1) recording a non-blank dot for the aimed picture element while setting a size of the recorded dot at a first predetermined size, when both:
         i) the second picture element represents a blank dot, and
         ii) the third picture element represents a non-blank dot;
      2) recording a non-blank dot for the aimed picture element while setting the size of the recorded dot at a second predetermined size larger than the first predetermined size when neither:
         i) the second picture element represents a blank dot, nor
         ii) the third picture element represents a non-blank dot; and
      3) disabling recording of a non-blank dot when the aimed picture element has a content representing a blank dot,
   wherein the recording step b) is conducted while moving the aimed picture element by one picture element each time the aimed picture element is recorded.

2. A method as claimed in claim 1 in which said second predetermined size is set to be larger than an optimum size.

3. A method as claimed in claim 1 wherein said image is formed by moving the aimed picture element for which a dot is being recorded from a picture element to a next picture element along each said line.

4. A method as claimed in claim 1, wherein said setting of the size f the recorded dot at the first predetermined size and said setting of the size of the recorded dot at the second predetermined size each include:
changing an intensity of an optical beam.

5. A method as claimed in claim 1, wherein said setting of the size of the recorded dot at the first predetermined size and said setting of the size of the recorded dot at the second predetermined size each include:
changing a beam spot size of an optical beam.

6. An image forming method for forming an image on a recording medium as an array of non-blank dots and blank dots one line at a time, based upon image information representing a content of picture elements included in each said line, each said line extending in a primary scanning direction with the non-blank dots and blank dots being aligned in the primary scanning direction, the method comprising the steps of:
a) detecting a content of said picture elements for every three consecutive picture elements aligned in a secondary scanning direction that is perpendicular to said primary scanning direction, each of said three consecutive picture elements being defined by a first end and a second opposing end and including an aimed picture element that corresponds to a recording of a dot at said first end, wherein the step a) of detecting the content of the picture elements is conducted while moving the aimed picture element by one picture element each time the content of the aimed picture element is detected;
b) recording one of said non-blank and blank dots for each said set of three consecutive picture elements by:
1) recording a non-blank dot for the aimed picture element while setting a size of the recorded dot at a first predetermined size, when both:
i) a second picture element of the three consecutive picture elements represents a blank dot, and
ii) a third picture element of the three consecutive picture elements represents a non-blank dot;
recording a non-blank dot for the aimed picture element while setting a size of the recorded dot at a second predetermined size larger than the first predetermined size when neither:
i) the second picture element represents a blank dot nor
ii) the third picture element represents a non-blank dot; and
3) disabling recording of non-blank dots when the aimed picture element has a content corresponding to a blank dot; wherein the recording step b) is conducted while moving the aimed picture element by one picture element each time the aimed picture element is recorded.

7. An image recording system for recording an input image on a recording medium, comprising:
a shift register supplied with binary input image signals sequentially one horizontal scanning line by one horizontal scanning line, said shift register having three columns for holding the binary image signals of three consecutive picture elements included in one said horizontal scanning line at a time;
an image processor supplied with the binary image signals from each of the columns of the shift register for producing an output control signal in response to a combination of the binary image signals held in the columns of the shift register;
a driver circuit supplied with the control signal from the image processor for producing an output drive signal under control of the control signal; and
a light source supplied with the output drive signal from the driver circuit for producing an optical beam in response to the drive signal;
said image processor controlling the light source such that the optical beam has a reduced intensity when an image signal for an aimed picture element located at a first end of the three consecutive picture elements has a first logic value representing a recording of a dot by an irradiation of the optical beam, a neighboring picture element included in the three consecutive picture elements at a location adjacent to the aimed picture element has a second logic value representing a non-recording of another dot by the optical beam, and a picture element included in the three consecutive picture elements at a second opposing end of the three consecutive picture elements has the first logic value.

8. An image recording system for recording an input image on a recording medium by optical beams as an array of exposed dots, comprising:
first memory means for storing binary input image signals supplied sequentially line by line, each said line including a plurality of picture elements represented by the image signals, said first memory means having first, second and third columns for holding the image signals of three consecutive picture elements of one said line respectively wherein the image signal being held by one o said first and third columns corresponds to an aimed picture element of which content is subjected to recording, said first memory means being supplied with the input image signals sequentially at the first column and storing said input image signals by passing the input image signals consecutively from the first column to the second column and from the second column to the third column, said third column outputting the input image signals sequentially;
second memory means having a plurality of columns corresponding to each of the picture elements included in said one line, said second memory means being supplied with the input image signals sequentially from the first memory means for storing the input image signals for said one line;
first processor means supplied with the input image signals from the first, second and third columns of the first memory means simultaneously, for producing an output logic signal in response to a combination of contents of the input image signals supplied thereto, said first processor means producing the output logic signal each time the input image signal is passed from one of said columns to a next of said columns in the first memory means;
third memory means having a plurality of columns corresponding to each of the picture elements included in said one line, said third memory means being supplied with the output logic signal sequentially from the first processor means for storing the output logic signal for said one line;

second processing means having a number of columns corresponding to each of the picture elements included in said one line, each of said columns of said second processing means being supplied with an output of a corresponding one of said columns of the second memory means and with an output of a corresponding one of said columns of the third memory means, for producing an output signal from each of the columns of the second processing means in response to a combination of an output of the second memory means and an output of the third memory means; and optical source array comprising an array of light emitting devices corresponding to each of said columns of the second and third memory means, each of the light emitting devices of said optical source array being supplied with the output signal from a corresponding one of said columns of the second processor means for producing one of said optical beams for recording, said optical source array recording the dots by the optical beams, each of said optical beams being changed in size in response to the corresponding output signal from the second processor means.

9. A system as claimed in claim 8, wherein:
a) said first processor means produces the output logic signal with a first predetermined logic value only:
  1) when the binary image signals being held in the first and third columns of the first memory means each have a value representing a recording of a dot and
  2) simultaneously when a binary image signal in the second column of the first memory means has a value representing a non-recording of a dot; and
b) said first processor means produces the output logic signal with a second, different logic value when other combinations appear in the binary image signals being held in the first memory means.

10. A system as claimed in claim 8, wherein:
a) said second processor means produces the drive signal to control the optical source array such that each of said optical beams corresponding to each said aimed picture element has:
  1) a reduced output power when the output logic signal of the first processor means has a first predetermined logic value; and
  2) an unreduced output power when both:
    i) the output of logic signal of the first processor means has a second logic value; and
    ii) an output of the second memory means indicates that the aimed picture element represents a dot to be recorded.

11. An image recording system for recording an input image on a recording medium by optical beams as an array of recorded dots, said input image being provided as binary image signals sequentially a line at a time, each said line including a plurality of picture elements, said image recording system comprising:
a) first memory means, being supplied with the binary image signals sequentially a line at a time and having a plurality of columns corresponding to the picture elements included in one said line, for storing the image signals in corresponding to the picture elements for said one line;
b) second memory means, being supplied with the binary image signals for a line next to the line stored in the first memory means and having a plurality of columns corresponding to the columns of the first memory means, for storing second binary image signals in the corresponding columns of the second memory means;
c) third memory means, being supplied with the binary image signals for a line next to the line stored in the second memory means and having a plurality of columns corresponding to the columns of the second memory means, for storing third binary image signals in the corresponding columns of the third memory means;
d) processing means, having a plurality of columns corresponding to the columns of the first, second and third memory means, each of the columns of said processing means being supplied with the binary image signals stored in the corresponding columns of the first, second and third memory means, for producing an output signal indicative of a size of a dot of the array of dots formed by each of the optical beams, each output signal corresponding to an aimed picture element, each aimed picture element being defined for one of the columns of said processing means as a picture element that is included in one of the first and third memory means, such that:
  1) the output signal assumes a first predetermined value when the image signals stored in the corresponding columns of the first and third memory means both represent a recording of the dot while the image signal stored in the corresponding column of the second memory means alone represents a non-recording of the dot;
  2) the output signal assumes a second predetermined value different from the first predetermined value when the output signal for the aimed picture element represents a non-recording of the dot; and
  3) the output signals assumes a third predetermined value different from any of the first and second predetermined values when the image signals in the corresponding columns of the first, second and third memory means have other combinations.

* * * * *